United States Patent [19]

Noel et al.

[11] Patent Number: 5,303,610
[45] Date of Patent: Apr. 19, 1994

[54] HANDBRAKE FOR A VEHICLE

[75] Inventors: Jean P. Noel, Saint-Die; Bruno Gertsch, Epinal, both of France

[73] Assignee: Rockwell Body Component Systems, France en abrege

[21] Appl. No.: 868,928

[22] Filed: Apr. 15, 1992

[30] Foreign Application Priority Data

Apr. 15, 1991 [FR] France ................ 91 04587

[51] Int. Cl.⁵ .................. G05G 1/04; G05G 1/06
[52] U.S. Cl. ................ 74/535; 74/577 M; 74/523; 74/528; 74/538
[58] Field of Search ............. 74/523, 577 R, 577 M, 74/575, 538, 535, 528, 557, 540; 192/111 A

[56] References Cited

U.S. PATENT DOCUMENTS

| 4,819,501 | 4/1989 | Kraus et al. | 74/528 X |
| 4,881,425 | 11/1989 | Kanno | 74/538 |
| 5,151,844 | 9/1992 | Lin | 74/523 X |
| 5,159,850 | 11/1992 | Naoi et al. | 74/577 M X |

FOREIGN PATENT DOCUMENTS

| 0466534 | 1/1992 | European Pat. Off. | 74/523 |
| 2645982 | 4/1978 | Fed. Rep. of Germany | 74/523 |
| 3900661 | 7/1990 | Fed. Rep. of Germany | 74/523 |
| 2-53657 | 2/1990 | Japan | 74/523 |

Primary Examiner—Vinh T. Luong

[57] ABSTRACT

This brake, suitable for being connected to a brake cable (6), comprises a toothed sector (1) fitted with a dentation (2) which sector is intended to be fixed to the floor of the vehicle, a pawl (9) provided with locking teeth (13) interacting with the dentation (2) of the sector and a hollow manual gripping lever (5) equipped with an internal push-button rod (7), one end (7a) of which interacts with the pawl in order to keep it in the locking position of the brake due to the thrust of a return spring (14); the pawl (9), articulated about a pin (11), interacts with a member (17), which may be an additional tooth (17) forming part of an over-moulded covering (16) on the metal body (12) of the pawl, positioned between the teeth (13) of the locking mechanism and the pin (11), or an intermediate member which is not integrally connected to the pawl; this member is dimensioned in order to slide over the dentation (2) while the lever (5) is being operated, thereby keeping the teeth (13) of the locking mechanism away from the dentation (2). This arrangement eliminates the noise from operating the pawl in previous brakes.

1 Claim, 3 Drawing Sheets

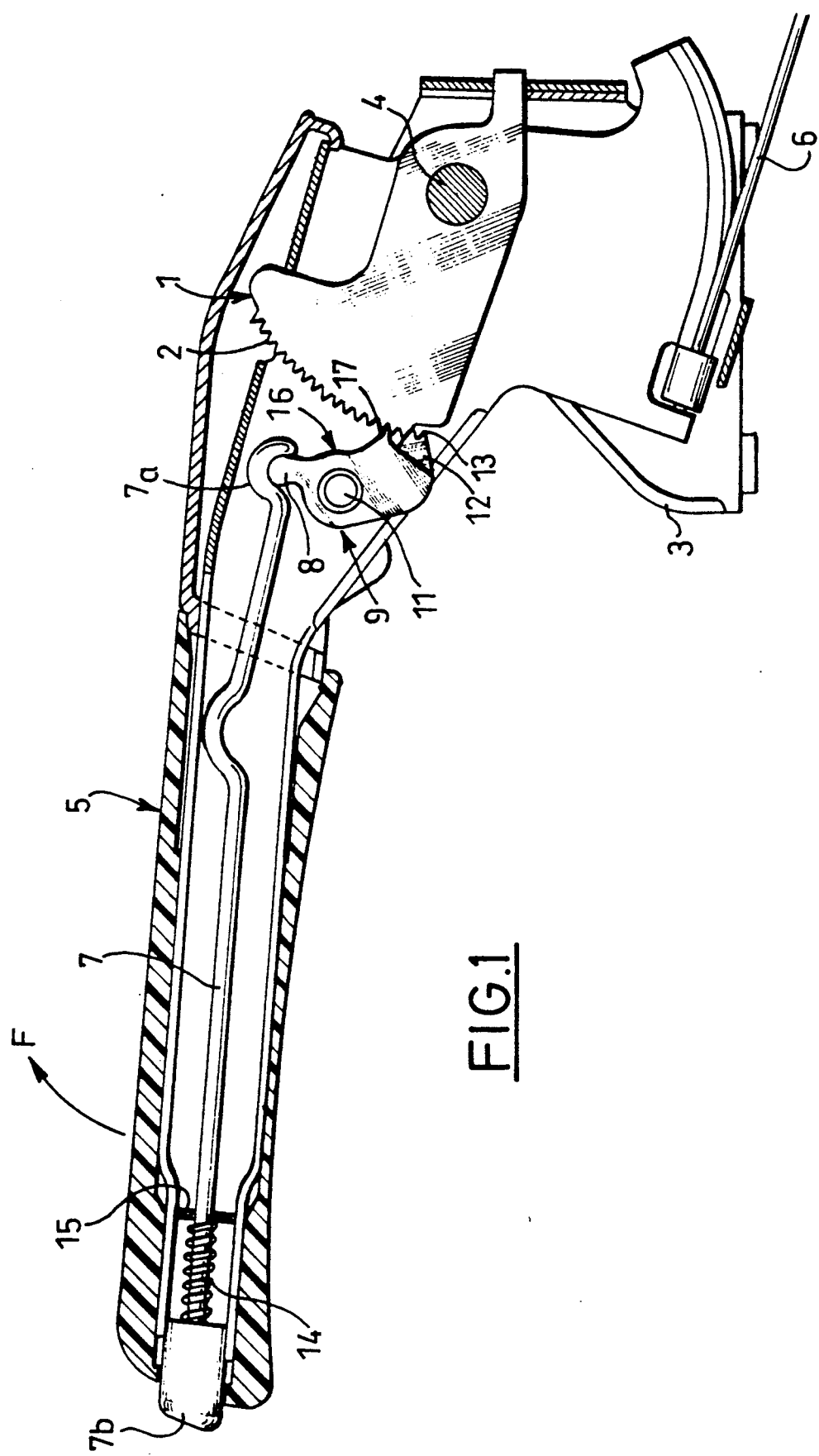

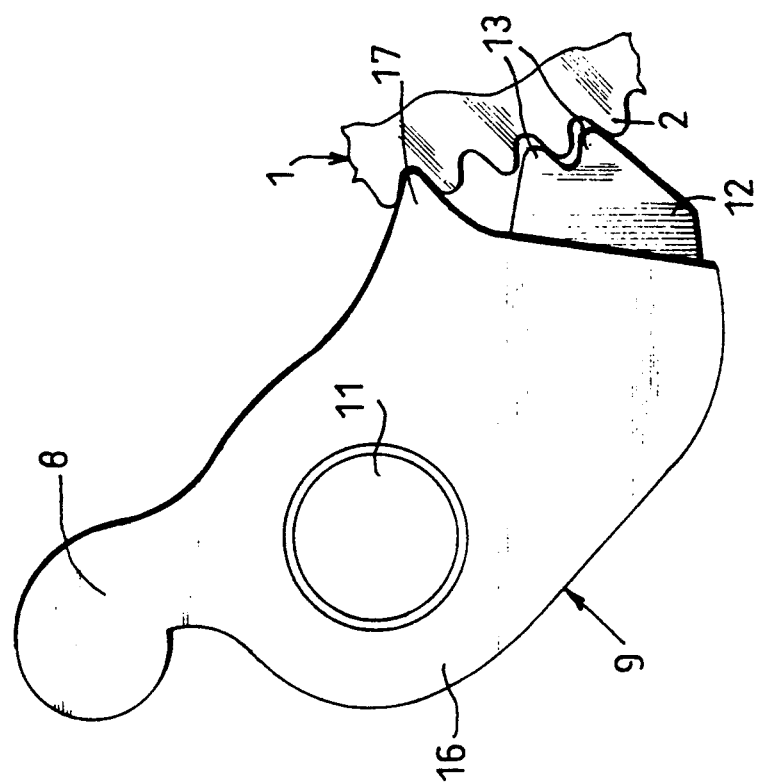
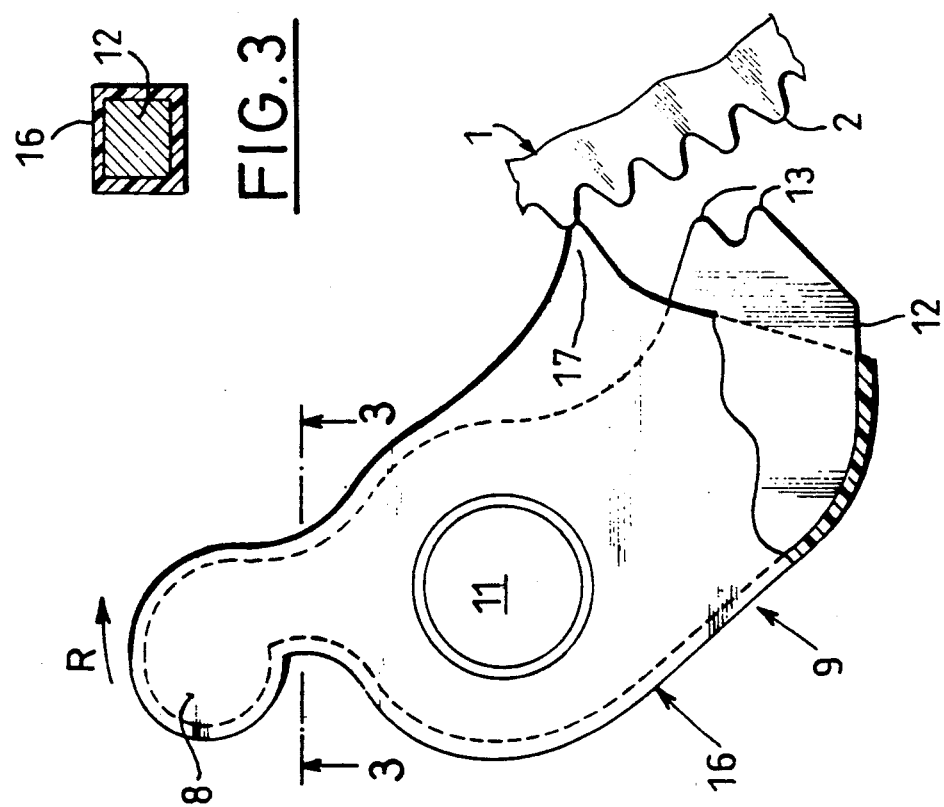

HANDBRAKE FOR A VEHICLE

BACKGROUND OF THE INVENTION

The subject of the present invention is a handbrake for parking a motor vehicle, suitable for being connected to a brake cable.

This brake is of the type comprising a toothed sector intended to be fixed to the floor of the vehicle, a pawl suitable for interacting with the toothed sector and a manual hollow gripping lever equipped with an internal push-button rod, one end of which interacts with the pawl in order to keep locking teeth of the latter in engagement with the toothed sector due to the thrust of elastic means, the pawl being articulated about a pin internal to the lever.

The elastic means may be constituted by a helical spring positioned around the push-button rod and exerting on the latter a thrust in the direction which keeps the teeth of the pawl engaged in the dentation of the sector.

In order to operate this brake, the user tilts the lever to its new position. During this operation of applying the brake, the friction of the teeth of the pawl on the dentation of the sector and their successive ratcheting constitute a source of undesirable noise.

The object of the invention is therefore to produce a parking brake which does not have this drawback.

SUMMARY OF THE PRESENT INVENTION

According to the invention, the pawl interacts with a member arranged between its locking teeth and its rotation pin and dimensioned in order to slide over the dentation of the sector while the gripping lever is being operated, whereas the locking teeth are then away from this dentation.

According to a first embodiment of the invention, this member is an additional tooth forming part of an overmoulded plastic covering a metal body of the pawl.

According to a second embodiment, the above-mentioned member is a terminal tooth of an intermediate part which is between the pawl and the toothed sector and is freely articulated on a transverse pin internal to the gripping lever, this intermediate part enabling the teeth of the pawl to move away from the dentation while the lever is being operated.

In both cases, the member associated with the pawl enables the teeth of the latter to be moved away while the lever is being operated. The reason for this is that the additional tooth (or the intermediate part), by virtue of its positioning between the rotation pin and the locking teeth, can remain in sliding contact with the dentation of the sector while the lever is being tilted, whereas the locking teeth are away from this dentation. As a result, after completing the application, the position of the additional tooth determines that of the locking teeth which then come into engagement with the dentation exactly at the place desired by the user.

According to one embodiment of the invention, the additional tooth forms part of a covering made from a plastic moulded over a metal body of the pawl.

This plastic is appropriately chosen so as to have a sufficient mechanical strength, a sufficient abrasion resistance and a low coefficient of friction. Such a material may be, for example, an elastomeric polyester.

The invention will now be described with reference to the attached drawing which illustrates an exemplary and non-limiting embodiment thereof.

BRIEF DESCRIPTION OF THE DRAWINGS

FIG. 1 is a view, in longitudinal cross-section and partial elevation, of a first embodiment of the handbrake for parking a vehicle according to the invention, in a position with the brake off.

FIG. 2 is a view, in lateral elevation on a larger scale and with removal of the pawl and of the toothed sector of the brake of FIG. 1, the pawl being shown in the position which it occupies while the brake is being applied.

FIG. 3 is a cross-sectional view along 3—3 of FIG. 2.

FIG. 4 is a view, similar to FIG. 2, showing the pawl in a locked position on the dentation of the sector.

DESCRIPTION OF THE PREFERRED EMBODIMENTS

Figure 5:
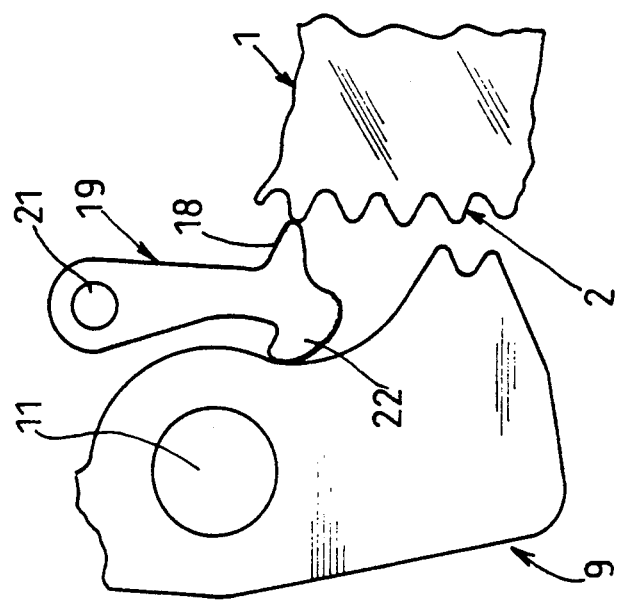
FIG. 5 is a view, in partial elevation, of a second embodiment of the member associated with the pawl and with the toothed sector, showing the locked pawl on the sector.

The handbrake for parking a motor vehicle, shown in FIG. 1, comprises a toothed sector (1) provided with a dentation (2), fixed to the floor (not shown) of the vehicle by means of a support (3) which, together with the sector (1), are traversed by a pin (4). To the latter is articulated a manual gripping lever (5), the end close to the rotation pin (4) of which is fixed to a brake cable (6) in a manner known per se.

The lever (5) is hollow and contains an internal push-button rod (7), a curved-over end (7a) of which interacts with a lug (8) of a pawl (9) rotatably articulated about a transverse pin (11) fixed to the walls of the lever (5). The pawl (9) comprises a metal body or core (12) which is terminated at one of its ends by teeth (13) for locking the brake in a position with the brake applied, when these teeth (13) are in engagement with teeth of the dentation (2).

The push-button rod (7) is fitted with a terminal push button (7b) partially projecting from the end of the lever (5) and normally kept in this position by elastic means, for example a helical spring (14), surrounding the rod (7) and bearing on a transverse element (15) which is fixed to the walls of the lever (5) and traversed by the rod (7). In this position, shown in FIG. 1, the spring (14) therefore exerts a thrust on the rod (7), in the direction opposite the sector (1), such that the terminal portion (7a) exerts a moment on the pawl (9) tending to keep the teeth (13) applied against the sector (1), either outside the dentation (2) (FIG. 1) or in engagement with the latter, that is to say in a brake-applied position.

The metal body (12) of the pawl (9) is covered, except at its end carrying the teeth (13), with a moulded-over covering (16) having a tooth (17) positioned to the side of the teeth (13), between the latter and the rotation pin (11) of the pawl (9). The covering is chosen from a material which has a low coefficient of friction, is mechanically strong and, in addition, has a sufficient abrasion resistance, for example a plastic such as an elastomeric polyester.

The operation of the brake which has just been described is as follows.

At rest, the brake off is in the situation shown in FIG. 1, the teeth (13) not being in engagement with the dentation (2). On the other hand, by virtue of its dimensioning and of its positioning between the teeth (13) and the pin (11), the tooth (17) is engaged in the dentation (2).

When the user wishes to apply the brake, he exerts a transverse force (F) on the lever (5) in such a manner as to tilt it upwards (7b). During this movement of the lever (5), the end of the tooth (17) remains in sliding contact with the crowns of the teeth of the dentation (2), and as a result keeps the teeth (13) away from the dentation (2) (FIG. 2). After completing the rotation of the lever (5), the release of the force exerted on the latter by the user leads to the meshing of the tooth (17) with the dentation (2) and, correlatively, that of the teeth (13) with the dentation (2) in a locked position of the brake (FIG. 4).

By virtue of the construction of the tooth (17) made from an appropriately chosen plastic, as explained hereinabove, its sliding over the dentation (2) is performed noiselessly. In addition, after completing the application of the brake, the tooth comes back into engagement with the dentation (2), exactly in the position chosen by the user, and, consequently, the teeth (13) likewise.

Figure 6:
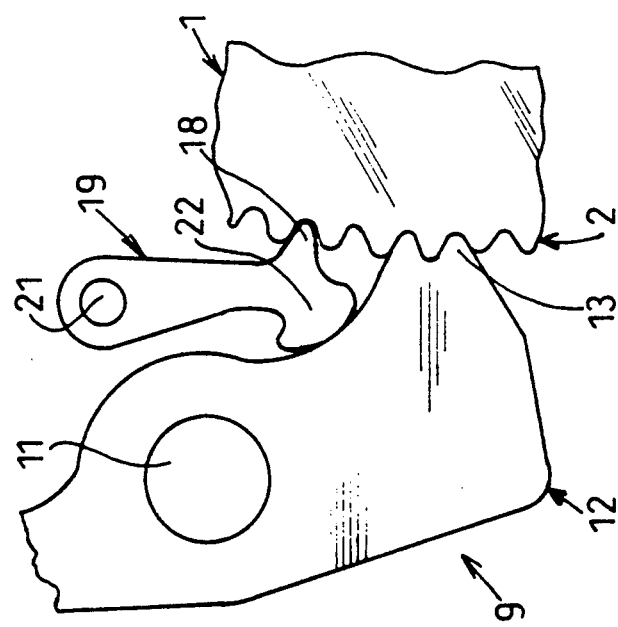
FIG. 6 is a view, similar to FIG. 5, showing the unlocked pawl and the associated member in a position for sliding around the toothed sector.

The pawl (9) keeps the brake locked in the position chosen for the lever (5) and the forces due to the tension of the cable (6) are taken by the metallic portion constituted by the body (12), the plastic tooth (17) not bearing on the dentation (2) although engaged between two teeth of the latter (FIG. 4). In the second embodiment shown in FIGS. 5 and 6, the pawl (9) is not fitted with a moulded-over covering and the member which is associated with it is a terminal tooth (18) of an intermediate part (19) between the pawl (9) and the toothed sector (1). This intermediate part (19), made from a plastic such as that provided for the moulded-over covering (16), is freely articulated, by means of its end on the opposite side from the tooth (18), to a transverse pin (21), internal to the gripping lever (5).

The part (19) furthermore comprises, at its end carrying the tooth (18), a protuberance (22) formed on the opposite side from the tooth and bearing on the pawl (9) while the lever (5) is being operated. The tooth (18) and the protuberance (22) are positioned, like the tooth (17) of the previous embodiment, between the teeth (13) locking the pawl (9) and its rotation pin (11). In a position for locking the teeth (13) in the dentation (2) (FIG. 5), the tooth (18) is engaged in this dentation (2) and the protuberance (22) bears on the pawl (9).

While the lever (5) is being operated (FIG. 6), the teeth (13) are away from the dentation (2) and are kept in this position by the protuberance (22) of the part (19), the tooth (18) of which slides over the teeth of the dentation (2). When the user releases the lever (5), the teeth (13) come back into engagement with the structure (2) and the part (19) resumes its position of FIG. 5.

The advantages of this second embodiment are the same as those of the first embodiment described with reference to FIGS. 1 to 4.

We claim:

1. A handbrake for maintaining a parked vehicle stationary, suitable for being connected to a brake cable (6), comprising a toothed sector (1) which is intended to be fixed to the vehicle, a pawl (9) suitable for interacting with the toothed sector, and a manual hollow gripping lever (5) equipped with an internal push-button rod (7) whose end (7a) interacts with the pawl in order to keep locking teeth (13) of the latter in engagement with the toothed sector (1) due to the thrust of elastic means (14), the pawl being articulated about a pin (11) internal to the lever, characterised in that the pawl (9) interacts with a member arranged between locking teeth (13) and rotation pin (11) and dimensioned in order to slide over the indentation (2) of the sector (1) while the gripping lever is being operated and further includes an additional tooth (17) forming part of a moulded-over plastic covering on a metal body (12) of the pawl (9).

* * * * *